United States Patent Office 3,401,148
Patented Sept. 10, 1968

3,401,148
METHOD OF PREPARING SULFUR-CONTAINING POLYESTERS
Richard J. Schlott and Frank Scardiglia, Arlington Heights, and Eugene P. Goldberg, Highland Park, Ill., assignors to Borg-Warner Corporation, Chicago, Ill., a corporation of Illinois
No Drawing. Filed Dec. 31, 1964, Ser. No. 422,505
5 Claims. (Cl. 260—49)

ABSTRACT OF THE DISCLOSURE

A method of making superpolyesters containing sufonate or thiocarbonate units from bisphenols and diacid chlorides via a solution process utilizing aliphatic tertiary amines as the acid acceptor.

This invention relates to an improved method of preparing superpolyesters and more particularly to the preparation of polymers and copolymers from dihydric phenols reacted with sulfur-containing diacid chlorides.

Heretofore, superpolyesters have been prepared by a variety of polymerization reactions such as, for example, ester interchange, interfacial polycondensation, melt condensation, and the like. It has been difficult, when utilizing these reactions, to obtain high purity polyesters of high molecular weight due to interference of contaminants in side reactions. Further, purification of the polymer after polymerization has presented formidable practical problems especially when interfacial and/or melt reactions were employed. Thus, reproducibility, i.e., the ability to produce polymers having the same physical and chemical properties, as well as molecular weight and purity, from batch to batch, was difficult to obtain.

Briefly described, this invention provides an improved method of making polymers and copolymers containing sulfonate ester structural units and/or aromatic thiocarbonate ester structural units by reacting dihydric phenols with diacid chlorides. In the method of this invention, the diphenols and diacid chlorides are placed in an inert organic solvent, i.e., a solvent for the polymer to be formed, in the presence of an aliphatic tertiary amine acid acceptor.

The method of this invention has not heretofore been utilized in the preparation of polymers and copolymers containing sulfonate ester structural units and/or aromatic thiocarbonate ester structural units. It was thought that it was not possible to obtain high molecular weight polysulfonate and polythiocarbonate polymers and copolymers by a solution polycondensation such as described and claimed in this invention.

It has been thought (as cited in Morgan and Kowlek, J. Polymer Sci., A2, 2693, 1964) that the aliphatic tertiary amines such as triethylamine were poor acid acceptors when used with sulfonyl chlorides. It was also thought that they would react with the sulfonyl chlorides to form sulfonamides and alkyl halides, which in turn would lead to chain termination in the polycondensation. It has been found, however, that triethylamine and similar tertiary aliphatic amines are extremely effective in promoting the condensation of disulfonyl chlorides and/or thiophosgene with disphenols in a solution polymerization. The reaction proceeds at ambient temperatures to yield high molecular weight sulfonate and/or thiocarbonate homopolymers and/or copolymers.

The improved method of the present invention is an extremely useful method for making polymers and copolymers utilizing dihydric phenols, aromatic and/or aliphatic diacid chlorides in which at least one of the acid chlorides contains a sulfonyl chloride function and/or a thiocarbonyl chloride function. In making the polymers and copolymers, if thiophosgene is used, it is reacted with a dihydric phenol to form an aromatic polythiocarbonate. Similarly, if a disulfonyl chloride is used, it is reacted with a dihydric phenol to form a polysulfonate.

The solution polycondensation of the present invention may be carried out at room temperature, however, the reaction temperature may extend from about −40° C. to about +120° C. The reaction is relatively free of contaminating side reactions and high molecular weight polymers and copolymers are easily obtained. When the polymers and copolymers are prepared, which contain a thiocarbonate ester structural unit therein, it is preferred to conduct the polymerization on the lower end of the temperature range, i.e., from about 0° C. to about −40° C. The temperature may, of course, be higher, though it has been found that the resulting polymers containing thiocarbonate ester structural units possess better physical and chemical characteristics when prepared at lower temperatures.

The inert organic solvent which may be used in this invention may be any solvent that has good solvent power with respect to the polymer formed. Typical of such solvents are the chlorinated hydrocarbon solvents, e.g., methylene chloride, tetrachloroethylene, tetrachloroethane, chloroform, o-dichlorobenzene, etc.

The tertiary aliphatic and/or cycloaliphatic amines utilized in this invention may be amines such as triethylamine, tri-n-butylamine, dioctadecylmethylamine, dimethylbenzylamine, N-methylpiperidine, N,N'-dimethylpiperazine, and N-methylmorpholine. Though tertiary aliphatic amines are generally suitable in the solution polymerization of this invention, it is preferred to use highly basic amines such as triethylamine which have relatively low $pK_b$ values (usually below about 5.0–6.0).

The use of aliphatic tertiary amines is an essential feature of this invention. The aliphatic amines are combined with the monomers in at least a stoichiometric amount to obtain high molecular weight polymers. It is preferred that the amount of amine be slightly in excess of a stoichiometry, i.e., at least about one percent excess. Amines, such as pyridine, that have been reported as useful in solution polyesterification heretofore are unsatisfactory for the purposes of the present invention.

This invention, as indicated above, is operable for the preparation of a great variety of high molecular weight polymers and copolymers utilizing dibydric penols and aromatic and/or aliphatic diacid chlorides wherein at least one of the acid chlorides contains a sulfonyl chloride function and/or a thiocarbonyl chloride function.

The diacid chlorides may be represented by the formulas:

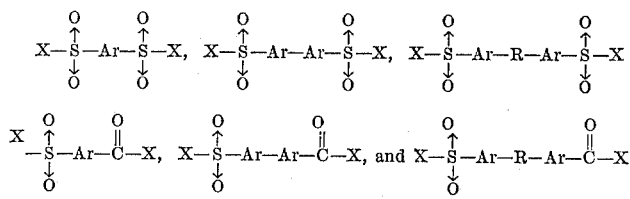

and the bisphenols may be represented by the formulas

and

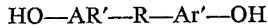

in which the Ar and Ar' linkages in the diacid chlorides and bisphenols represent bivalent aromatic radicals selected from the group consisting of para-phenylene radicals, meta-phenylene radicals, methylene substituted para-phenylene radicals, and halogen substituted para-phenylene radicals, and R and R' in the diacid chlorides and bisphenols represent a bivalent radical selected from the group consisting of an ether radical, a carbonyl radical, a sulfonyl radical, a saturated hydrocarbon radical, and a carbon atom which forms part of a cycloaliphatic ring.

The polymers and copolymers of the present invention that are derived from sulfonyl chlorides contain sulfonate ester structural units therein. The sulfonate ester structural units may be derived from aromatic or aliphatic disulfonyl chlorides and/or aromatic and aliphatic sulfonyl-carbonyl chlorides. The aromatic and aliphatic disulfonyl chlorides that may be utilized in this invention may be generally represented by the formula:

wherein A may be an aliphatic or aromatic group or mixed aliphatic or aromatic group. Examples of the aromatic disulfonyl chlorides that may be useful in preparing the polymers and copolymers of this invention include benzenedisulfonyl chlorides of which the following are representative: o-, m-, and p-benzenedisulfonyl chlorides; 1-chloro-2,4-benzenedisulfonyl chloride; 1-bromo-3,5-benzenedisulfonyl chloride; 1-nitro-3,5-benzenedisulfonyl chloride; 1-methyl-2,4-benzenedisulfonyl chloride; 1-methyl-4-chloro-2,6-benzenedisulfonyl chloride; 1,2-dimethyl-3,5-benzenedisulfonyl chloride; 1,5-dimethyl-2,4-benzenedisulfonyl chloride; 1-4-dimethyl-2,6-benzenedisulfonyl chloride; 1-methoxy-2,4-benzenedisulfonyl chloride; 1-methyl-2,4-benzenedisulfonyl chloride.

Also useful are the biphenyl disulfonyl chlorides of which the following are typical: 2,2'-biphenyldisulfonyl chloride; 3,3'-biphenyldisulfonyl chloride; 4,4'-biphenyldisulfonyl chloride; 4,4'-dibromo-3,3'-biphenyldisulfonyl chloride; 4,4'-dimethyl-3,3'-biphenyldisulfonyl chloride. Also the aryl sulfone disulfonyl chlorides, such as 3,3'-phenylsulfone disulfonyl chlorides, 3,3' or 4,4'-dibenzothiophenedioxide disulfonyl chloride, are useful as are diarylalkane compounds typified by 4,4'-diphenylmethanedisulfonyl chloride; 2,2-bis-(4-phenylsulfonyl chloride)-propane and the like.

Aryl ether disulfonyl chlorides, such as 4,4'-phenyletherdisulfonyl chloride; 2,4'-phenyletherdisulfonyl chloride; 4,4'-biphenyletherdisulfonyl chloride; and the like are applicable as are naphthalene and anthracene derivatives such as the following: 1,3-naphthalenedisulfonyl chloride; 2,6-naphthalenedisulfonyl chloride; 1-chloro-2,7-naphthalenedisulfonyl chloride; 1-chloro-3,5-naphthalenedisulfonyl chloride; 1-nitro-3,6-naphthalenedisulfonyl chloride; 2-ethoxyl-1,6-naphthalenedisulfonyl chloride; 1,5-anthracenedisulfonyl chloride; 1,8-anthracenedisulfonyl chloride and the like.

Also as mentioned, sulfonyl-carbonyl chlorides may be utilized in this invention. Sulfonyl-carbonyl chlorides may be represented by the formula:

wherein A is an aromatic or aliphatic group or a mixed aliphatic or aromatic group. Examples of chlorosulfonyl-carbonyl chlorides that are useful in the practice of this invention are the chlorosulfonyl-benzoyl chlorides of which the following are representative: o-, m-, p-chlorosulfonylbenzoyl chloride; 3-chlorosulfonyl-4-chlorobenzoyl chloride; 3-chlorosulfonyl-4-methylbenzoyl chloride; 3-chlorosulfonyl-4-methoxybenzoyl chloride. Also useful are biphenyl-chlorosulfonyl-carbonyl chlorides of which the following are examples: 2-chlorosulfonyl-2'-biphenylcarbonyl chloride and 4-chlorosulfonyl-4'-biphenylcarbonyl chloride. Arylsulfone chlorosulfonyl-carbonyl chlorides such as 3-chlorosulfonyl-3'-phenylsulfonecarbonyl chloride are useful as are diarylalkane compounds typified by 4-sulfonyl-4'-diphenylmethanecarbonyl chloride. Arylether chlorosulfonyl-carbonyl chlorides such as 4-chlorosulfonyl-4'-phenylethercarbonyl chloride; 2-chlorosulfonyl-4'-phenylethecarbonyl chloride; 4-chlorosulfonyl-4'-phenylethercarbonyl chloride, etc., are applicable as are naphthalene and anthracene derivatives such as 1-chlorosulfonyl-4-naphthalenecarbonyl chloride; 2-chlorosulfonyl-6-naphthalenecarbonyl chloride; 8-chlorosulfonyl-1-anthracene-carbonyl chloride and the like. Other types of aromatic sulfonyl-carbonyl chlorides may be apparent to those skilled in the art.

Aliphatic chlorosulfonyl-carbonyl chlorides are also useful and are exemplified by: chlorosulfonylacetyl chloride; 2-chlorosulfonylstearyl chloride; and w-sulfonylstearyl chloride and the like. Also, arylalkyl sulfonylcarbonyl chlorides may be used such as 4-sulfonylphenylacetyl chloride; 3-sulfonylphenylacetyl chloride; 2-sulfonylphenylacetyl chloride, etc. Other suitable sulfonyl-carbonyl chlorides will be apparent to those skilled in the art.

As mentioned above, this invention is also directed to the preparation of high molecular weight polymers and copolymers containing aromatic thiocarbonate ester structural units in the polymer chain. The aromatic thiocarbonate structural units are ordinarily obtained by the reaction of thiophosgene or other thiocarbonyl compounds with dihydric phenol. The aromatic thiocarbonate ester structural units are generally depicted by the formula:

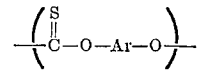

wherein Ar is an aromatic carbocyclic group.

The dihydric phenols utilized in preparing polymers and copolymers by the method of this invention may be virtually any diphenol including bisphenols, examples of which are:

2,2-bis-(4-hydroxyphenyl)-propane (Bisphenol-A);
bis-(2-hydroxyphenyl-methane;
bis-(4-hydroxyphenyl)-methane;
1,1-bis-(4-hydroxyphenyl)-ethane;
1,2-bis-(4-hydroxyphenyl)-ethane;
1,1-bis-(3-chloro-4-hydroxyphenyl)-ethane;
1,1-bis-(3,5-dimethyl-4-hydroxyphenyl)-ethane;
2,2-bis-(3-phenyl-4-hydroxyphenyl)-propane;
2,2-bis-(4-hydroxynaphthyl)-propane;
2,2-bis-(4-hydroxyphenyl)-pentane;
2,2-bis-(4-hydroxyphenyl)-hexane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-ethane;
2,2-bis-(4-hydroxyphenyl)-1-phenylpropane;
bis-(3-nitro-4-hydroxyphenyl)-methane;
bis-(4-hydroxy-2,6-dimethyl-3-methoxyphenyl)-methane;
2,2-bis-(3,5-dichloro-4-hydroxyphenyl)-propane;
2,2-bis-(3-bromo-4-hydroxyphenyl)-propane.

The above list of diphenols is meant to be illustrative and not exclusive in that there are a great many dihydric phenols that may be utilized in the method of this invention.

By the process of this invention, the sulfur containing acid chlorides and dihydric phenols may be reacted to form either homopolymers or copolymers. They may also be reacted with dicarboxylic acid chlorides, to form carboxylate copolymers.

The order of addition of reactants may be varied. For example, the acid chlorides may be placed in a solution of an inert organic solvent with the subsequent addition of diphenols, and tertiary aliphatic amine in an inert organic solvent. Alternatively, the addition of the tertiary aliphatic amine may take place after mixing of diphenols and acid chlorides.

The invention will be further illustrated by the following specific examples, however, the scope of the invention is not limited thereto. All reduced viscosities were measured in tetrachloroethane at 0.1 g./dl. at 25° C.

Examples of tertiary amines which are not effective catalysts are shown in Examples I–IV below.

EXAMPLE I

Attempted use of pyridine as the catalyst for preparing sulfonate-carboxylate superpolyesters 0.5 mole of Bisphenol-A and 0.015 mole of 4,4'-biphenyldisulfonyl chloride was added to 150 ml. of methylene chloride at room temperature. 0.12 mole of pyridine were added to the stirred suspension of Bisphenol-A and disulfonyl chloride. While stirring, the mixture was cooled to 20° C. and a solution containing 0.035 mole of isophthalyl and terephthalyl chloride (50/50) in 100 ml. of methylene chloride was slowly added thereto. Stirring was maintained for approximately twenty minutes after the completion of the addition. *No polymer was obtained.*

EXAMPLE II

Attempted use of N,N-dimethylaniline as a catalyst 0.05 mole of Bisphenol-A and 0.015 mole of 4,4'-biphenyldisulfonyl chloride were added to 150 ml. of methylene chloride at room temperature. 0.12 mole of N,N-dimethylaniline were added to the stirred suspension. The color of the mixture darkened considerably. The temperature of the suspension was raised to reflux and a solution of 0.035 mole of isophthalyl and terephthalyl chlorides (50/50) in 15 ml. of methylene chloride were added slowly. A sample of this darkly colored mixture, when precipitated in methanol, gave *no polymeric material.*

EXAMPLE III

Attempted use of 2,6-lutidine as a catalyst

The method of Example II was followed, using 2,6-lutidine as the catalyst in place of N,N-dimethylaniline. The precipitated material was low polymer, having a reduced viscosity of of 0.12 dl./g.

EXAMPLE IV

Attempted use of pyridine as a catalyst for polythiocarbonate preparation

A solution of 0.05 mole of Bisphenol-A in 100 ml. of dry pyridine was prepared. To this stirred solution at −20° was slowly added a solution of 0.05 mole of thiophosgene in 50 ml. of methylene chloride over a 65 minute period. The solution became black. A sample of the material, precipitated in methanol, was dark brown and had a reduced viscosity of 0.1.

EXAMPLE V

Preparation of a sulfonate-carboxylate superpolyester using triethylamine as catalyst 0.05 mole of Bisphenol-A and 0.015 mole of 4,4'-biphenyldisulfonyl chloride were added to 130 ml. of methylene chloride at room temperature. 0.11 mole of triethylamine were added to the stirred mixture of bisphenol and disulfonyl chloride. The mixture was cooled to 20° under constant stirring and a solution containing 0.035 mole of mixed isophthalyl and terephthalyl chlorides (50/50) in 10 ml. of methylene chloride was added slowly thereto. Stirring was maintained for approximately twenty minutes after completion of the addition. The polymer mixture was washed well with dilute hydrochloric acid and with water, then precipitated in methanol. The vacuum-dried polymer had a reduced viscosity of 0.48 dl./g.

A group of aliphatic tertiary amines were evaluated by employing them directly in the process of Example V in place of triethylamine. The reduced viscosities of the resulting polymers are shown in Table I below.

Table I

| Amine: | Polymer reduced viscosity, dl./g. |
| --- | --- |
| Tri-n-butylamine | 0.35 |
| Dioctadecylmethylamine | 0.37 |
| N-methylpiperidine | 0.34 |
| N,N'-dimethylpiperazine | 0.44 |
| N,N-dimethylbenzylamine | 0.37 |
| N-methylmorpholine | 0.31 |

EXAMPLE VI

Preparation of a sulfonate-carboxylate superpolyester using triethylamine as catalyst 0.05 mole of Bisphenol-A and 0.015 mole of 4,4'-phenyletherdisulfonyl chloride were added to 130 ml. of methylene chloride at room temperature. 0.11 mole of triethylamine were added to the stirred mixture of bisphenol and disulfonyl chloride. The mixture was cooled to 20° under constant stirring and a solution containing 0.035 mole of mixed isophthalyl and terephthalyl chlorides (50/50) in 10 ml. of methylene chloride was slowly added thereto. Stirring was maintained for approximately twenty minutes after completion of the addition. The polymer mixture was washed well with dilute hydrochloric acid and with water, then precipitated in methanol. The vacuum-dried polymer had a reduced viscosity of 0.44 dl./g.

EXAMPLE VII

Preparation of a sulfonate-carboxylate superpolyester using triethylamine as catalyst 0.05 mole of Bisphenol-A and 0.015 mole of 3,3'-phenylsulfonedisulfonyl chloride were added to 130 ml. of methylene chloride at room temperature. 0.11 mole of triethylamine were added to the stirred mixture of bisphenol and disulfonyl chloride. The mixture was cooled to 20° under constant stirring and a solution containing 0.035 mole of mixed isophthalyl and terephthalyl chlorides (50/50) in 10 ml. of methylene chloride was slowly added thereto. Stirring was maintained for approximately twenty minutes after completion of the addition. The polymer mixture was washed well with dilute hydrochloric acid and with water, then precipitated in methanol. The vacuum-dried polymer had a reduced viscosity of 0.85 dl./g.

EXAMPLE VIII

Preparation of a sulfonate-carboxylate superpolyester using triethylamine as catalyst 0.05 mole of Bisphenol-A and 0.015 mole of 4-chlorosulfonylbenzoyl chloride were added to 130 ml. of methylene chloride at room temperature. 0.11 mole of triethylamine were added to the stirred mixture of bisphenol and disulfonyl chloride. The mixture was cooled at 20° under constant stirring and a solution containing 0.035 mole of mixed isophthalyl and terephthalyl chlorides (50/50) in 10 ml. of methylene chloride was slowly added thereto. Stirring was maintained for approximately twenty minutes after completion of the addition. The polymer mixture was washed well with dilute hydrochloric acid and with water, then precipitated in methanol. The vacuum-dried polymer had a reduced viscosity of 0.78 dl./g.

EXAMPLE IX

Preparation of a sulfonate polymer

A stirred suspension of 0.05 mole of Bisphenol-A and 0.05 mole of 4,4'-biphenyldisulfonyl chloride in 125 ml. of methylene chloride was caused to polymerize by the slow addition of 0.12 mole of triethylamine. The resulting mixture was stirred an additional hour, washed with dilute aqueous acid and water, and coagulated with methanol. The resulting vacuum-dried polymer had a reduced viscosity of 0.63 dl./g. when measured in 1,1,2,2-tetrachloroethane.

EXAMPLE X

Preparation of a sulfonate-carboxylate copolymer 0.05 mole of Bisphenol-A and 0.10 mole of triethylamine were placed in 80 ml. of methylene chloride. 0.015 mole of 4,4'-biphenyldisulfonyl chloride and 0.035 mole of mixed isophthalyl and terephthalyl chlorides (50/50) were placed in 90 ml. of methylene chloride. The bisphenol and triethylamine solution was added to the acid chlorides and the mixture was stirred for thirty minutes after addition. The polymer that was formed was washed with dilute hydrochloric acid and water and coagulated with methanol. It was found that the polymer had a reduced viscosity of 0.55 dl./g. when measured in a solution of 1,1,2,2-tetrachloroethane.

EXAMPLE XI

Preparation of a sulfonate-carboxylate copolymer 0.05 mole of Bisphenol-A and 0.11 mole or triethylamine were added to 75 ml. of methylene chloride under constant stirring. 0.035 mole of mixed isophthalyl and terephthalyl chlorides (50/50) and 0.015 mole of 4,4'-biphenyldisulfonyl chloride were added to 90 ml. of methylene chloride. The acid chloride solution was slowly added to the bisphenol and triethylamine and stirring was maintained for approximately twenty minutes after completion of the addition. The polymer solution was coagulated after being washed well with dilute hydrochloric acid and with water. The vacuum-dried polymer had a reduced viscosity of 0.56 dl./g. when measured in 1,1,2,2-tetrachloroethane.

EXAMPLE XII

Preparation of a sulfonate-carboxylate copolymer 0.18 mole of triethylamine were added dropwise to a stirred solution of 0.06 mole of Bisphenol-A and 0.018 mole of 4,4'-biphenyldisulfonyl chloride in 170 ml. of orthodichlorobenzene at 108°. The resulting mixture was cooled to 30° and a solution of 0.042 mole of mixed isophthalyl and terephthalyl chlorides (50/50) in 40 ml. of ortho-dichlorobenzene was slowly added. The polymer solution was stirred an additional hour, washed well to remove triethylamine hydrochloride, then coagulated in methanol. The dried polymer had a reduced viscosity of 0.68 dl./g. in tetrachloroethane.

EXAMPLE XIII

Preparation of sulfonate-carboxylate block copolymer

A solution of 0.036 mole of 4,4'-biphenyldisulfonyl chloride and 0.0364 mole of Bisphenol-A in 75 ml. of dry methylene chloride was polymerized by the slow addition of .08 mole of triethylamine. The reaction mixture was stirred for approximately twenty minutes after completion of addition to the triethylamine. The polysulfonate obtained had a reduced viscosity of 0.43 dl./g. when measured in 1,1,2,2,-tetrachloroethane. A solution of 0.0833 mole of Bisphenol-A and 18.52 grams of triethylamine were added to 260 ml. of methylene chloride and in turn this solution was added to the aforementioned polymer solution. Polymerization was completed by the dropwise addition of 17.0 moles of terephthalyl chloride in 40 ml. of methylene chloride. The solution was stirred for approximately twenty minutes after addition, washed well to remove triethylamine hydrochloride and precipitated in methanol. The dry polymer was crystalline (4 percent by X-ray) and too insoluble in trichloroethane for measurement of the intrinsic viscosity. After molding the sample, it became more crystalline, i.e., 17 percent by X-ray measurement.

EXAMPLE XIV

Preparation of sulfonate-carboxylate copolymer

A solution of 0.09 mole of Bisphenol-A and 0.03 mole of 4,4'-biphenyldisulfonyl chloride in 300 ml. of dry methylene chloride was polymerized in 0.22 mole of dry triethylamine. The polymerization began during addition and stirring was continued for approximately twenty minutes after addition to complete the reaction. The solution was cooled below 20° C. and 0.01 mole of hydroquinone was added to the solution. The stirred solution was maintained at about 10° to 15° C. during dropwise addition of a solution of 0.07 mole of isophthalyl chloride-terephthalyl chloride (50/50) in 30 ml. of methylene chloride. The solution was washed well to remove the triethylamine hydrochloride and precipitated in methanol. The polymer had a reduced viscosity of 1.13 dl./g.

EXAMPLE XV

Preparation of sulfonate-carboxylate copolymer

A solution of 0.09 mole of Bisphenol-A and 0.03 mole of 4,4'-biphenyldisulfonyl chloride in 300 ml. of dry methylene chloride was allowed to react with 0.22 mole of dry triethylamine. The polymerization began during addition and stirring was continue for approximately twenty minutes after addition to complete the reaction. The solution was cooled below 20° C. and 0.01 mole of resorcinol was added to the solution. The stirred solution was maintained at about 10° to 15° C. during dropwise addition of a solution of 0.07 mole of isophthalyl chloride-terephthalyl chloride (50/50) in 30 ml. of methylene chloride. The solution was washed well to remove the triethylamine hydrochloride and precipitated in methanol. The polymer had a reduced viscosity of 0.98 dl./g.

EXAMPLE XVI

Preparation of sulfonate-carboxylate copolymer

A solution of 0.09 mole of Bisphenol-A and 0.03 mole of 4,4'-biphenyldisulfonyl chloride in 300 ml. of dry methylene chloride was polymerized in 0.22 mole of dry triethylamine. The polymerization began during addition and stirring was continued for approximately twenty minutes after addition to complete the reaction. The solution was cooled below 20° C. and 0.01 mole of diphenolic acid amide was added to the solution. The stirred solution was maintained at about 10° to 15° C. during dropwise addition of a solution of 0.07 mole of isophthalyl chloride-terephthalyl chloride (50/50) in 30 ml. of methylene chloride. The solution was washed well to remove the triethylamine hydrochloride and precipitated in methanol. The polymer had a reduced viscosity of 0.47 dl./g.

EXAMPLE XVII

Preparation of sulfonate-carboxylate copolymer

A solution of 0.05 mole of Bisphenol-A and 0.015 mole of 4.4'-biphenyldisulfonyl chloride in 150 ml. of dry methylene chloride was polymerized by dropwise addition of 0.11 mole of triethylamine. The solution was stirred for approximately twenty minutes after the addition of the triethylamine and cooled to about 12° C. A solution of 0.0332 mole of isophthalyl chloride-terephthalyl chloride (50/50) and 0.00175 mole of fumaryl chloride in 20 ml. of methylene chloride was added dropwise to the polymerized solution. The combined solutions were cooled to about 5° to 10° C. The final polymer obtained was light tan and had a reduced viscosity of 0.91 dl./g.

EXAMPLE XVIII

Preparation of sulfonate-carboxylate copolymer

A solution of 0.05 mole of Bisphenol-A, 0.015 mole of 4,4'-biphenyldisulfonyl chloride and 0.11 mole of triethylamine in 150 ml. of methylene chloride was prepared. To this stirred mixture was slowly added a solution of 0.035 mole of sebacoyl chloride in 20 ml. of methylene chloride. The polymer solution was washed well with water, then coagulated in methanol. The dried polymer had a reduced viscosity of 0.67 dl./g. in tetrachloroethane.

EXAMPLE XIX

Preparation of sulfonate-carbonate copolymer

A mixture of 0.05 mole of Bisphenol-A and 0.025 mole of 4,4'-biphenyldisulfonyl chloride in 125 ml. of methylene chloride was allowed to react with 0.05 mole of triethylamine. The resulting solution was stirred while a solution of 0.025 mole of phosgene in 25 ml. of methylene chloride was added slowly. The resulting polymer solution was washed well to remove triethylamine hydrochloride and precipitated in methanol. The dried sulfonate-carbonate had a reduced viscosity of 1.26 dl./g.

EXAMPLE XX

Preparation of thiocarbonate polymer 0.15 mole of triethylamine were added to a stirred suspension of 0.05 mole of Bisphenol-A in 100 ml. of methylene chloride. The stirred solution was cooled to −20° C. and 0.05 mole of thiophosgene in 50 ml. of methylene chloride were added dropwise over a one-hour period. The polymer solution was stirred another hour at −20° C., then warmed to room temperature. The solution was washed to remove aminehydrochloride and coagulated in methanol. The dried polymer had a reduced viscosity of 0.92 dl./g. when measured in 1,1,2,2-tetrachloroethane.

EXAMPLE XXI

Preparation of a thiocarbonate-carboxylate copolymer 0.0375 mole of thiophosgene and 30 ml. of methylene chloride were added to a stirred solution of 0.05 mole of Bisphenol-A and 0.15 mole of triethylamine in 100 ml. of methylene chloride at −10° C. over a period of one hour. The mixture was held at −10° C. for one-half hour and 0.0125 mole of a solution of a 50/50 mixture of isophthalyl and terephthalyl chloride in 10 ml. of methylene chloride were added over a one-half hour period. The viscous solution was washed well and precipitated in methanol. The dried thiocarbonate-carboxylate copolymer had a reduced viscosity of 0.82 dl./g. when measured in 1,1,2,2-tetrachloroethane.

EXAMPLE XXII

Preparation of thiocarbonate-carboxylate copolymer

A solution of 0.05 mole of Bisphenol-A and 0.105 mole of triethylamine were added over a one-hour period to a solution of 0.0125 mole of thiophosgene in 85 ml. of methylene chloride. The solution was maintained at a temperature of −10° C. throughout the reaction. The mixture of 0.0395 mole of a 50/50 mixture of isophthalyl and terephthalyl chlorides in 20 ml. of methylene chloride were added over a one-half hour period. The solution was stirred for one additional half hour and allowed to warm to room temperature. The precipitated and dried thiocarbonate-carboxylate copolymer had a reduced viscosity of 0.85 dl./g. when measured in 1,1,2,2-tetrachloroethane.

EXAMPLE XXIII

Preparation of thiocarbonate-carbonate copolymer

A solution of 0.025 mole of thiophosgene in 20 ml. of methylene chloride was added slowly to a stirred mixture of 0.05 mole of Bisphenol-A and 0.15 mole of triethylamine in 100 ml. of dry methylene chloride at −10° C. over a half-hour period. The stirred mixture was held −10° C. for one-half hour and a solution of 0.028 mole of phosgene in 25 ml. of methylene chloride was added slowly over a one-hour period. The viscous polymer solution was washed well and precipitated in methanol. The resulting dry thiocarbonate-carbonate polymer had a reduced viscosity of 1.32 dl./g. when measured in 1,1,2,2-tetrachloroethane.

EXAMPLE XXIV

Preparation of a thiocarbonate-sulfonate copolymer 0.15 mole of triethylamine were added over a twenty-minute period to a stirred solution of 0.05 mole of Bisphenol-A and 0.015 mole of 4,4'-biphenyldisulfonyl chloride in 125 ml. of methylene chloride at room temperature. The resulting mixture was stirred and cooled to −20° C. while a solution of 0.035 mole of thiophosgene in 30 ml. of methylene chloride was added over a one-hour period. The viscous solution was stirred for one hour and coagulated in methanol to provide a thiocarbonate-sulfonate copolymer with a reduced viscosity of 0.62 when measused in 1,1,2,2-tetrachloroethane.

It is apparent that aliphatic tertiary amines generally will be effective catalysts for this process, whereas the usual polyesterification catalysts such as heterocyclic amines and aromatic tertiary amines do not lead to high molecular weight products.

This process of the invention provides sulfonate-containing polymers having properties superior to those polymers obtained by the best previously available procedures. These polymers are much improved in resistance to hydrolysis as indicated by weight loss in boiling aqueous caustic as shown in Table II.

Table II

Hydrolytic stability of Bisphenol-A/isophthalate-terephthalate-4,4'-biphenyldisulfonate copolymers measured by weight loss in 10% aqueous sodium hydroxide at 100° C. for twenty hours.

| Sulfonate carboxylate ratio (molar) | Percent weight loss | |
|---|---|---|
| | I. Interfacially polymerized | II. Solution polymerized |
| 50/50 | 2.9 | 1.6 |
| 30/70 | 6.0 | 1.2 |
| 20/80 | 8.3 | 2.2 |

The polymers of Column I were prepared by the best available interfacial condensation process using the indicated ratios of 4,4'-biphenyldisulfonyl chloride, together with a 50/50 mixture of isophthalyl and terephthalyl chlorides. The polymers of Column II were prepared in solution essentially following the method of Example V and employing the same ratios of reactants as the polymers of Column I.

It will be recognized that the enhancement of hydrolytic stability realized for materials prepared by this process represents a major improvement in polymer preparation.

It is known that the usual interfacial polycondensation process generally results in broadly polydisperse polymers having a polynodal distribution of molecular weights. The solution polymerization process provides more nearly monodisperse products. This desirable characteristic of narrower molecular weight distribution is associated with a low level of acidic end group functions in these polymers, as measured by a dye interaction technique (see S. R. Palit et al., J. Poly Sci. 58 1225–1232 (1962). A 30% sulfonate copolymer prepared by the solution polymerization technique of Example V had 0.80 $10^{-6}$ moles of acidic end groups per gram of polymer whereas the value for a similar polymer prepared by the best available interfacial polycondensation process was $10 \times 10^{-6}$ moles per gram. It is obvious that these values could be altered by deliberate end-capping of polymer chains. As produced, however, the solution polycondensation sulfonate polymers and copolymers have less than $3 \times 10^{-6}$ moles of acidic end groups per gram of polymer, while interfacially produced polymers exhibit a considerably greater concentration of such end groups.

It will be understood that the specific examples set forth above are not meant to in any way restrict the invention but merely to illustrate that a great variety of polymers and copolymers may be formed by the method of this invention.

It will be noted also that in many of the examples, an amount of tertiary aliphatic amine in excess of stoichiometry was employed. It has been found that a slight excess is desirable to obtain high molecular weight polymers and benefits obtained from such excesses are not adversely affected if the excess increases to 100 mole percent or more. Also, the polymerization was generally carried out at room temperature with the exception of the thiocarbonate containing polymers. This indicates that the reaction is not extraordinarily sensitive to temperature and that the temperature may be maintained as low as $-40°$ C. or as high as $120°$ C. during the reaction.

It will be apparent that many widely different embodiments of this invention may be made without departing from the spirit and scope thereof and therefore, it is not intended to be limited except as indicated in the appendant claims.

What is claimed is:

1. A method for preparing superpolyesters having reduced viscosities when measured in tetrachloroethane at $25°$ C., in excess of 0.3 dl./g., said polyesters containing in their linear chain ester structural units selected from the group consisting of

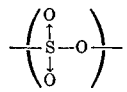

and

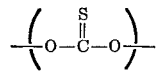

comprising the step of reacting at least one diphenol selected from the group consisting of 2,2-bis-(4-hydroxyphenyl)-propane, (Bisphenol-A);
bis-(2-hydroxyphenyl)-methane;
bis-(4-hydroxyphenyl)-methane;
1,1-bis-(4-hydroxyphenyl)-ethane;
1,2-bis-(4-hydroxyphenyl)-ethane;
1,1-bis-(3-chloro-4-hydroxyphenyl)-ethane;
1,1-bis-(3,5-dimethyl-4-hydroxyphenyl)-ethane;
2,2-bis-(3-phenyl-4-hydroxyphenyl)-propane;
2,2-bis-(4-hydroxynaphthyl)-propane;
2,2-bis-(4-hydroxyphenyl)-pentane;
2,2-bis-(4-hydroxyphenyl)-hexane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-ethane;
2,2-bis-(4-hydroxyphenyl)-1-phenylpropane;
bis-(3-nitro-4-hydroxyphenyl)-methane;
bis-(4-hydroxy-2,6-dimethyl-3-methoxyphenyl)-methane;
2,2-bis-(3,5-dichloro-4-hydroxyphenyl)-propane;
2,2-bis-(3-bromo-4-hydroxyphenyl)-propane, with at least one diacid chloride selected from the group consisting of

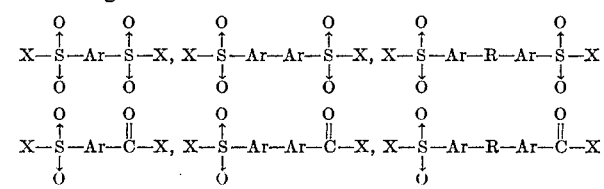

and

wherein Ar is a bivalent aromatic radical selected from the group consisting of p-phenylene radicals, m-phenylene radicals, methylene-substituted p-phenylene radicals and halogen-substituted p-phenylene radicals, and R is a bivalent radical selected from the group consisting of an ether radical, a carbonyl radical, a sulfonyl radical, a saturated hydrocarbon radical and a carbon atom in a cycloaliphatic ring group, said diphenol and diacid chloride reacted in an inert organic solvent in the presence of an aliphatic tertiary amine.

2. The method of claim 1 wherein at least a stoichiometric amount of aliphatic tertiary amine is used.

3. The method of claim 1 wherein the aliphatic tertiary amine is triethylamine.

4. The method of claim 1 wherein the polyesters that are prepared contain in their linear chain ester structural units of the formula:

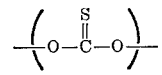

said polyester provided by reacting at least one diphenol selected from the group consisting of 2,2-bis(4-hydroxyphenyl)-propane, (Bisphenol-A);
bis-(2-hydroxyphenyl)-methane;
bis-(4-hydroxyphenyl)-methane;
1,1-bis-(4-hydroxyphenyl)-ethane;
1,2-bis-(4-hydroxyphenyl)-ethane;
1,1-bis-(3-chloro-4-hydroxyphenyl)-ethane;
1,1-bis-(3,5-dimethyl-4-hydroxyphenyl)-ethane;
2,2-bis-(3-phenyl-4-hydroxyphenyl)-propane;
2,2-bis-(4-hydroxynaphthyl)-propane;
2,2-bis-(4-hydroxyphenyl)-pentane;
2,2-bis-(4-hydroxyphenyl)-hexane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-ethane;
2,2-bis-(4-hydroxyphenyl)-1-phenyl-propane;
bis-(3-nitro-4-hydroxyphenyl)-methane;
bis-(4-hydroxy-2,6-dimethyl-3-methoxyphenyl)-methane;
2,2-bis-(3,5-dichloro-4-hydroxyphenyl)-propane;
2,2-bis-(3-bromo-4-hydroxyphenyl)-propane with thiophosgene.

5. The method of claim 1 wherein said polyesters contain in their linear chain ester structural units of the formula:

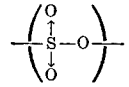

comprising the step of reacting at least one diphenol selected from the group consisting of 2,2-bis-(4-hydroxyphenyl)-propane, (Bisphenol-A);
bis-(2-hydroxyphenyl-methane;
bis-(4-hydroxyphenyl)-methane;
1,1-bis-(4-hydroxyphenyl)-ethane;
1,2-bis-(4-hydroxyphenyl)-ethane;
1,1-bis-(3-chloro-4-hydroxyphenyl)-ethane;
1,1-bis-(3,5-dimethyl-4-hydroxyphenyl)-ethane;
2,2-bis-(3-phenyl-4-hydroxyphenyl)-propane;
2,2-bis-(4-hydroxynaphthyl)-propane;
2,2-bis-(4-hydroxyphenyl)-pentane;
2,2-bis-(4-hydroxyphenyl)-hexane;
bis-(4-hydroxyphenyl)-phenylmethane;
bis-(4-hydroxyphenyl)-cyclohexylmethane;
1,2-bis-(4-hydroxyphenyl)-1,2-bis-(phenyl)-ethane;
2,2-bis-(4-hydroxyphenyl)-1-phenyl-propane;

bis-(3-nitro-4-hydroxyphenyl)-methane;
bis-(4-hydroxy-2,6-dimethyl-3-methoxyphenyl)-methane;
2,2-bis-(3,5-dichloro-4-hydroxyphenyl)-propane;
2,2-bis-(3-bromo-4-hydroxyphenyl)-propane with at least one diacid chloride selected from the group consisting of

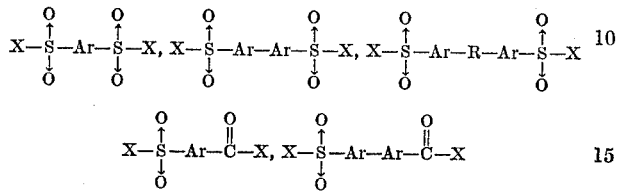

and

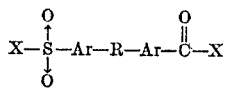

wherein Ar is a bivalent aromatic radical selected from the group consisting of p-phenylene radicals, m-phenylene radicals, methylene-substituted p-phenylene radicals and halogen-substituted p-phenylene radicals, and R is a bivalent radical selected from the group consisting of an ether radical, a carbonyl radical, a sulfonyl radical, a saturated hydrocarbon radical and a carbon atom in a cycloaliphatic ring group.

References Cited

UNITED STATES PATENTS

| | | | |
|---|---|---|---|
| 3,277,684 | 1/1966 | Conix et al. | 260—47 |
| 3,262,914 | 7/1966 | Goldberg et al. | 260—49 |
| 3,277,055 | 10/1966 | Goldberg et al. | 260—49 |

OTHER REFERENCES

Sarenson and Campbell, Preparative Methods of Polymer Chemistry, Interscience, New York, 1961 (pages 100–101, 121–122, 128 relied on).

WILLIAM H. SHORT, *Primary Examiner.*

M. GOLDSTEIN, *Assistant Examiner.*